Patented Sept. 19, 1944

2,358,628

UNITED STATES PATENT OFFICE 2,358,628

DIELECTRIC COMPOSITION

Frank M. Clark, Pittsfield, Mass., assignor to General Electric Company, a corporation of New York No Drawing. Application March 10, 1944, Serial No. 525,945

5 Claims. (Cl. 252—66)

The present invention comprises improved dielectric compositions for use in electric capacitors which are intended for operation under conditions causing them to assume temperatures in the range of about 90 to 110° C., or higher.

It is the main object of my invention to stabilize electric capacitors against the deterioration to which ordinarily they are subject when operated at elevated temperatures.

Under ordinary conditions of operation which commonly do not involve a rise of temperature in excess of about 80° C., capacitors impregnated with chlorinated diphenyl, or equivalent halogenated aryl compounds, operate with low power losses and with long useful lives. However, when the operating temperature approximates and exceeds about 90° C., the power losses increase and deterioration sets in which becomes progressively intensified and leads to early failures. The deterioration is especially severe when the capacitor is operated on direct current voltage circuits.

I have discovered that such deterioration is substantially obviated when chlorinated diphenyl or like product is associated with a small amount of nitrated chlorodiphenyl, that is, the material produced by the nitration of chlorinated diphenyl, such as described, for example, in my prior U. S. Patent 2,019,337. Nitrated chlorodiphenyl when dispersed in the chlorinated diphenyl compositions in amounts no greater than about one-half to one per cent by weight has a surprisingly great effect in lengthening the life of capacitors in the range of operation at temperatures resulting in the absence of such addition in rapid deterioration. This favorable effect contrasts with the unfavorable effect resulting from the addition of materially larger amounts of nitrated chlorodiphenyl.

The following examples are illustrative of the beneficial effects obtainable by the practice of my invention.

Nitrated pentachlor diphenyl suitable for the purposes of my present invention may be prepared by introducing nitro groups into the molecular structure of pentachlor diphenyl, the manufacture of which is well understood. For example, to 2033 parts by weight of pentachlor diphenyl are mixed slowly and with agitation a mixture of sulphuric and nitric acid. Such a mixture may consist of 1200 parts by weight of concentrated sulphuric acid (specific gravity 1.84) and 840 parts of concentrated nitric acid (specific gravity 1.42). During the addition of the acid mixture the temperature of the reacting materials should be maintained in the range of 50 to 55° C. When the admixture is complete, the reacting materials are agitated for approximately 15 minutes at 50 to 55° C. The mixture then is washed with water and with a dilute solution of sodium hydroxide (about two per cent), washing with water being repeated after the washing with alkali. The product is purified by distillation under reduced pressure, and treatment with fuller's-earth or other absorbent material. Purification raises the electrical resistivity and dielectric strength and lowers the power factor.

Capacitors containing two spacers of .0004" kraft paper and having a capacity of about one microfarad when impregnated with pentachlor diphenyl and operated at 400 volts direct current at 110° C. become inoperable in about 135 to 140 hours of operation. When, however, capacitors of the same construction are impregnated with a composition consisting by weight of about 99.5 per cent of pentachlor diphenyl and about 0.5 per cent of nitrated pentachlor diphenyl, then the useful life is increased to well over 1600 hours under the same conditions. If the amount of nitrated diphenyl is increased, some reduction in life becomes evident, but when the amount of nitrated pentachlor diphenyl in the composition is about one per cent, the life is still as high as about 1000 hours.

The power factor of capacitors containing such compositions is not substantially increased by the presence of such small amounts of nitrated pentachlor diphenyl. In striking contrast, the capacitors impregnated with such compositions containing as much as ten per cent of the nitrated compound operate with high power factors even at ordinary operating temperatures and with shortened operating lives at high temperature.

The beneficial effect of additions of small amount of nitrated chlorodiphenyl is not limited to the particular composition used for purposes of illustration. The nitrated chlorodiphenyl may have different chlorine content, as indicated in a tabulation shown below. The nitrated chlorodiphenyl may also be employed for the stabilization at high temperatures of electric capacitors impregnated with various other halogenated aryl compositions, such for example as chlorinated or fluorinated diphenyl oxide, diphenyl methane, diphenyl ethane, naphthalene, or other polynuclear compound of this class. The benefits are also obtained when such compounds are mixed or blended with chlorinated benzene, as for example the trichlorbenzene described in my prior Patent 2,041,594.

While somewhat less favorable results are obtained with nitrated chlorodiphenyl compounds containing a lower proportion of chlorine, my invention is not limited to any particular chlorine content.

Instead of employing a nitrated chlorodiphenyl containing five chlorine atoms per molecule, a nitrated compound may be prepared containing a different number of chlorine molecules, for example a nitrated tetrachlor diphenyl. A capacitor impregnated with a blend of pentachlor diphenyl and containing no stabilizing product has a life of only about 135 hours, when operated at 110° C. with an impressed voltage of 400 volts direct current. These conditions of temperature and voltage may be considered as an accelerated life test.

When the pentachlor diphenyl is associated with about one-half per cent by weight of nitrated tetrachlor diphenyl, then the useful life is increased to 345 hours. When the addition of nitrated tetrachlor diphenyl is about one per cent by weight, the life is increased under these conditions to about 760 hours. Additions of greater amounts of the nitrated tetrachlor diphenyl produce some decrease of life.

The following tabulation shows the properties of various nitrated products of compounds of diphenyl also containing chlorine and varying from one to six chlorine atoms per molecule. These compounds are identified in the table as monochlor, dichlor, etc.:

tachlor diphenyl and 25 per cent trichlorbenzene have, when operated at 110° C. ambient in a circuit carrying 1000 volts direct current, a life of only about 48 hours. When containing about one per cent of nitrated chlorodiphenyl, the increase of life over the range of chlorination products is shown by the following tabulation in which only the stabilizer varies in chlorine content, the amount present in all cases being one per cent:

| | Hours |
|---|---|
| Nitrated monochlor diphenyl | 320 |
| Nitrated dichlor diphenyl | 350 |
| Nitrated trichlor diphenyl | 345 |
| Nitrated tetrachlor diphenyl | 400 |
| Nitrated pentachlor diphenyl | 450 |
| Nitrated hexachlor diphenyl | 400 |

At temperatures lower than 110° C., the life of course is materially longer. Under the adversely high operating temperature of 110° C. a life of 250 hours is considered as acceptable.

In a copending application Serial No. 522,114,

| Properties | Monochlor | Dichlor | Trichlor | Tetrachlor | Pentachlor | Hexachlor |
|---|---|---|---|---|---|---|
| Refractive index (25° C.) | 1.6398 | 1.6342 | 1.6438 | 1.6462 | 1.6454 | |
| Specific gravity: | | | | | | |
| 15.5° C./15.5° C. | | | 1.480 | 1.572 | | |
| 75° C./15.5° C. | | | | | 1.540 | |
| 100° C./15.5° C. | 1.340 | 1.400 | | 1.500 | 1.522 | 1.595 |
| Viscosity: | | | | | | |
| 37.8° C. | | | 11,500 | 30,000 | | |
| 100° C. | 57 | 61 | 63 | 89 | 71 | 284 |
| Color (A. S. T. M.) | Light yellow | Light yellow | Light yellow | Light yellow | Light yellow | Light yellow |
| Reaction | Neutral | Neutral | Neutral | Neutral | Neutral | Neutral |
| Free chlorides | Nil | Nil | Nil | Nil | Nil | Nil |
| Distilling range (deg. C.) | 200-260 (10 mm.) | 205-275 (10 mm.) | 230-300 (10 mm.) | 325-375 | 350-372 | 360-400 |
| Pour point | 9° C. | 18° C. | 23° C. | 26° C. | 48° C. | 52° C. |
| Dielectric constant at— | | | | | | |
| 25° C. | 22.7 | 10.1 | 11.6 | 10.0 | 7.0 | |
| 100° C. | 17.3 | 12.7 | 9.3 | 8.1 | 5.9 | 4.92 |

The advantages of my invention are obtained also at higher voltages. For example, capacitors containing three sheets of .0004" kraft paper when impregnated with pentachlor diphenyl containing about one per cent of nitrated pentachlor diphenyl may be operated with long lives at temperatures in the range of 90 to 100° C. on 800 volts direct current circuits.

The advantages of my invention are illustrated by the advantageous operating characteristics over a range of —40° C. to 100° C. of capacitors in which the impregnant consists mainly of a mixture of chlorinated diphenyl and trichlorbenzene. Commercial capacitors of the type having an electrical capacity of about one microfarad and contaning as spacers three sheets of .0004" kraft paper upon vacuum drying at 110 to 120° C. for 48 to 78 hours are impregnated with a mixture comprisig 75 per cent pentachlor diphenyl and 25 per cent trichlorbenzene, this mixture being blended with about one per cent of nitrated pentachlor diphenyl. At room temperature, capacitors thus impregnated have a capacity of one microfarad and a power factor of .3 to .35 per cent. At 100° C. such capacitors have a power factor of about .4 to .45 per cent and a capacity of about .97 microfarads. The capacity slowly increases as the temperature is lowered from 100° C. to —40° C. The insulation of such units at 25° C. is approximately 5000 megohm-microfarads.

Such units are capable of operating at 110° C. ambient temperature at 1000 volts direct current with material increase of life over similar units containing no stabilizer. Capacitors in which the impregnant consists solely of 75 per cent penfiled February 12, 1944, I have described and claimed compositions consisting of a halogenated aryl compound, such for example as chlorinated diphenyl, having blended therewith nitro compounds which are distinguishable from the nitrated compounds herein described by being derived by the chlorination of nitrodiphenyl compounds. The two classes of nitro compounds are distinct chemically and physically.

What I claim as new and desire to secure by Letters Patent of the United States is:

1. Dielectric compositions comprising halogenated aryl hydrocarbons blended with an amount up to about one per cent effective to retard thermal deterioration of nitrochlor diphenyl which is derived by the nitration of chlorinated diphenyl.

2. A dielectric composition comprising chlorinated diphenyl and approximately one per cent of a nitrochlor diphenyl which is derived by the nitration of chlorinated diphenyl.

3. Dielectric compositions comprising mixtures of pentachlor diphenyl and trichlorbenzene and an admixture of the order of one per cent by weight of nitrochlor diphenyl which is derived by the nitration of chlorinated diphenyl.

4. A range of capacitor impregnating compositions consisting of at least one chlorinated polynuclear aryl hydrocarbon having dissolved therein about one-half to one per cent of nitrated chlorodiphenyl.

5. A capacitor impregnating composition consisting of pentachlor diphenyl having dissolved therein about one-half per cent by weight of nitrated pentachlor diphenyl.

FRANK M. CLARK.